(12) United States Patent
Leversby et al.

(10) Patent No.: US 6,276,020 B1
(45) Date of Patent: *Aug. 21, 2001

(54) TOOTHBRUSH STRUCTURE

(75) Inventors: Knut Olaf Leversby, Sandvika; Knut Andresen; Nils Terje Vestheim, both of Oslo, all of (NO)

(73) Assignee: SmithKline Beecham p.l.c., Brentford (GB)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/084,537

(22) Filed: May 26, 1998

Related U.S. Application Data (63) Continuation-in-part of application No. 08/392,981, filed as application No. PCT/NO93/00132 on Sep. 1, 1993, now Pat. No. 5,761,759.

(30) Foreign Application Priority Data

Sep. 1, 1992 (DE) .................................................. 42 29 152

(51) Int. Cl.[7] ........................................................ A46B 9/04
(52) U.S. Cl. ......................... 15/167.1; 15/143.1; 264/243; 264/247; 264/260; 264/328.8
(58) Field of Search ............................... 15/143.1, 167.1, 15/167.2; 264/243, 247, 260, 328.8

(56) References Cited

U.S. PATENT DOCUMENTS

| | | |
|---|---|---|
| 3,914,081 | 10/1975 | Aoki . |
| 5,014,383 | 5/1991 | Costar . |
| 5,052,071 | 10/1991 | Halm . |
| 5,054,154 | 10/1991 | Schiffer et al. . |
| 5,305,489 | 4/1994 | Lage . |
| 5,339,482 | 8/1994 | Desimone et al. . |
| 5,761,759 | 6/1998 | Leversby et al. . |

FOREIGN PATENT DOCUMENTS

| | | | | |
|---|---|---|---|---|
| 3628722 | * | 2/1988 | (DE) ..................................... | 15/167.1 |
| 91 03 553.8 | | 8/1991 | (DE) . | |
| 0001044 | | 3/1979 | (EP) . | |
| 0611533 | * | 8/1994 | (EP) ..................................... | 15/167.1 |
| 1542567 | * | 10/1968 | (FR) ..................................... | 15/143.1 |
| 9409675 | * | 5/1994 | (WO) ................................... | 15/167.1 |

* cited by examiner

Primary Examiner—Randall E. Chin
(74) Attorney, Agent, or Firm—Nora Stein-Fernandez; Stephen A. Ventianer; Charles M. Kinzig (57) ABSTRACT

In making a toothbrush of the type having a shaft-like handle (3), a neck section (4) joining the handle and a head (5) for holding a plurality of toothbrush bristles (6), the body is made of a first plastic material through an injection molding step. In order to provide the body with two or more portions (20, 21, 22) made of a second material, e.g., elastic and/or non-slip material such as rubber-like material, or a material having a color different from that of the first material, the toothbrush body is provided with recess sections (17, 18, 19). The second material is supplied through a plurality of channels (29, 30, 31, 32) into injection nozzle means (33, 34, 35) to provide injection of the second material in a single step, multi-point injection process into the recesses on the body to form the portions (20, 21, 22), the recesses (17, 18, 19) and the portions (20, 21, 22) thus being physically isolated from each other by the first material.

30 Claims, 10 Drawing Sheets

TOOTHBRUSH STRUCTURE

This application is a continuation-in-part of U.S. patent application Ser. No. 08/392,981, filed Feb. 28, 1995 (102(e) date: Apr. 18, 1995), now U.S. Pat. No. 5,761,759, which is a U.S. National Stage filing based on PCT/NO93/00132, International Filing Date Sep. 1, 1993 (published Mar. 17, 1994 as WO 94/05183), which claims priority from German Patent Application P 4229152.6, filed Sep. 1, 1992.

BACKGROUND OF THE INVENTION

1. Field of the Invention

The invention relates to a toothbrush including a toothbrush body including a shaft-like handle, a head piece and a neck section, each being made of a first plastic material through injection molding, the neck section joining the head to the handle, and the head piece retaining a plurality of toothbrush bristles.

2. Description of the Related Art

Most of the various shapes of toothbrushes are already known. When used, the brush is rotated between the fingers holding it, depending on the various positions needed for the dental areas to be cleaned, and then securely held for the cleaning process itself. The holding of the toothbrush is generally done at the front end of the handle in front of the neck section joining the head of the brush, as the toothbrush is held between the thumb and index finger. This holding area customarily has a contour, possibly provided with a profiled portion, which favors advantageous holding of the brush in a "preferred" position or possibly in a position rotated 180 degrees to this. Intermediate positions require the hand or arm to be twisted, making it uncomfortable to carry out the cleaning movement which is intended.

In the art, it is known to have a toothbrush with one or more non-slip portions applied to the toothbrush body. Such portions are provided by a single point injection molding of elastic and/or non-slip material, e.g., rubber-like material, to fill recesses on the toothbrush body, thus forming the portions. However, "single point injection molding" implies that when two or more areas or recesses are to be filled in order to create such portions, there must be a material flow channel or channels available between such areas or recesses on the body in order to enable the material to flow into the areas or recesses in such a single shot, single point injection molding step. However, such channels in most cases are aesthetically non-satisfactory, and more than often a matter of design trade-off. Further, especially for toothbrush handles made of transparent material and in cases where a more flexible approach in toothbrush design is desired, such channels will in some cases cause the toothbrush body to be structurally weaker at the location of such channels or adjacent thereto, in particular at the neck region of the toothbrush body. In particular, if both the head and handle of the toothbrush are to have regions of such elastic and/or non-slip material, the prior art method of using single point injection molding of such material will result in a toothbrush having a structurally weakened neck because of the material flow channels located in the neck.

SUMMARY OF THE INVENTION

To avoid the deficiencies discussed above, those of the toothbrush itself and the method for making the toothbrush, the present invention proposes that for a toothbrush including a first material and a second material, the portions of second material are physically spaced apart from each other by the first material, that is, the portions of seconds material are not connected. Such a toothbrush will have an aesthetically improved appearance, as well as being structurally stronger than any prior art toothbrush which has such portions which are interconnected.

According to the invention, the toothbrush body includes a pair of spaced-apart recesses which accommodate a first portion and a second portion of the second material, the first and second portions of the second material being completely physically separated from each other by the first material. There is no channel or connection between the first portion and the second portion.

According to another embodiment of the invention, the toothbrush body includes a further recess accommodating a third portion of the second material, the third portion of second material being completely physically separated from each of the first and second portions by the first material. In some embodiments it may be desirable to have more than three recesses and portions of second material.

Still further embodiments of the toothbrush structure of the present invention will also appear from the attached patent claims as well as from the description below, with reference to the enclosed drawings.

The invention, together with its essential details, is explained below in greater detail with the aid of the enclosed drawings.

DETAILED DESCRIPTION OF THE PREFERRED EMBODIMENTS

Figure 1:
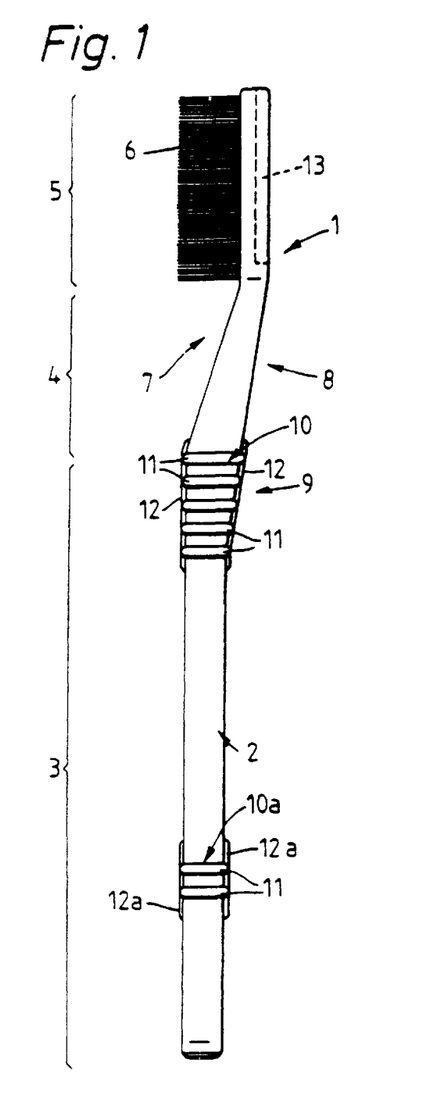
FIG. 1 shows a side view of an embodiment of the toothbrush according to the invention.

FIG. 1 shows a toothbrush 1 with a toothbrush body 2, the longitudinal extension of which is divided into three sections 3, 4, 5. These sections include a shaft-like handle 3, a neck section 4, and a head 5 at the front end. The head 5 is joined to the handle 3 by neck section 4, and has a plurality of bristles 6 on its front side. FIGS. 6, 8, 10, 12, 14, 16, 18 and 20 each also show toothbrush 1 having a toothbrush body 2, the longitudinal extension of which is divided into three sections 3, 4, 5 with a plurality of bristles 6 on the head 5. In the further course of this description, the side of the brush body from which the bristles 6 project will be denoted as the front 7 and the opposite side as the rear 8 of the toothbrush.

As can be clearly seen from FIGS. 1–3, 6–13 and 16–17, the handle 3 has finger rest portion 9 with a substantially circumferential or annular profiled section 10 at the front end of the handle. In FIGS. 1 and 2, 6 and 7, 8 and 9, and 16 and 17, this profiled section is formed by suitably elastic, circumferential rings 11 being mutually spaced in the longitudinal direction of the toothbrush. The finger rest portion 9 extends over an area which approximately corresponds to the length of a thumb resting at this area of the toothbrush and could in a typical example be approximately 2 cm long.

Figure 2:
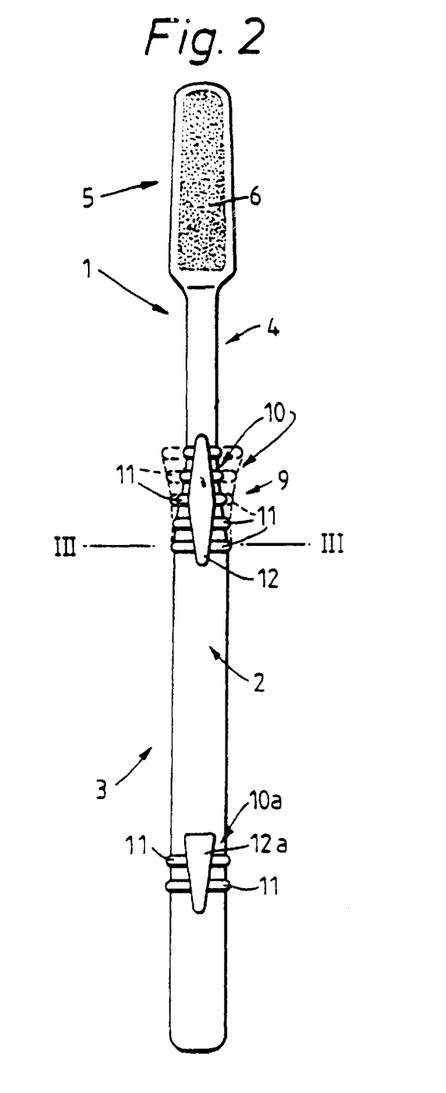
FIG. 2 is a front view rotated 90 degrees in relation to the view of FIG. 1.
Figure 3:
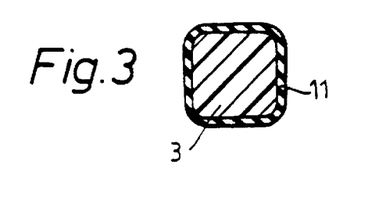
FIG. 3 is an enlarged cross section of the toothbrush at III—III of FIG. 2.

The rings 11 are located in ring shaped recesses extending around the handle circumference and are provided by a second multi-point injection process after the making of the toothbrush body 2 made by a first injection molding process. Due to the two-step injection processes, the second material will fit tightly into the recesses provided in the body 2.

The toothbrush body 2 is made by injection molding a first plastic material. First, second and any further portions of second material are located in recesses in body 2. Elastic and/or non-slip materials could be used as the second material, such material being mechanically softer than the first material of the toothbrush body, thus providing non-slip surfaces on the toothbrush body. Alternatively, the second material could be of the same type as the first material, but of different color than the first material.

Instead of section 10 being annular continuous circumferential rings 11 projecting above the surface of toothbrush body 3 as shown in FIGS. 1–2, 6–9 and 16–17, such rings may have interruptions along their circumference, or be approximately flush with the body. Alternately, section 10 may be a continuous area of second material such as shown in FIGS. 16–21.

Figures 20, 21, 22, 23:
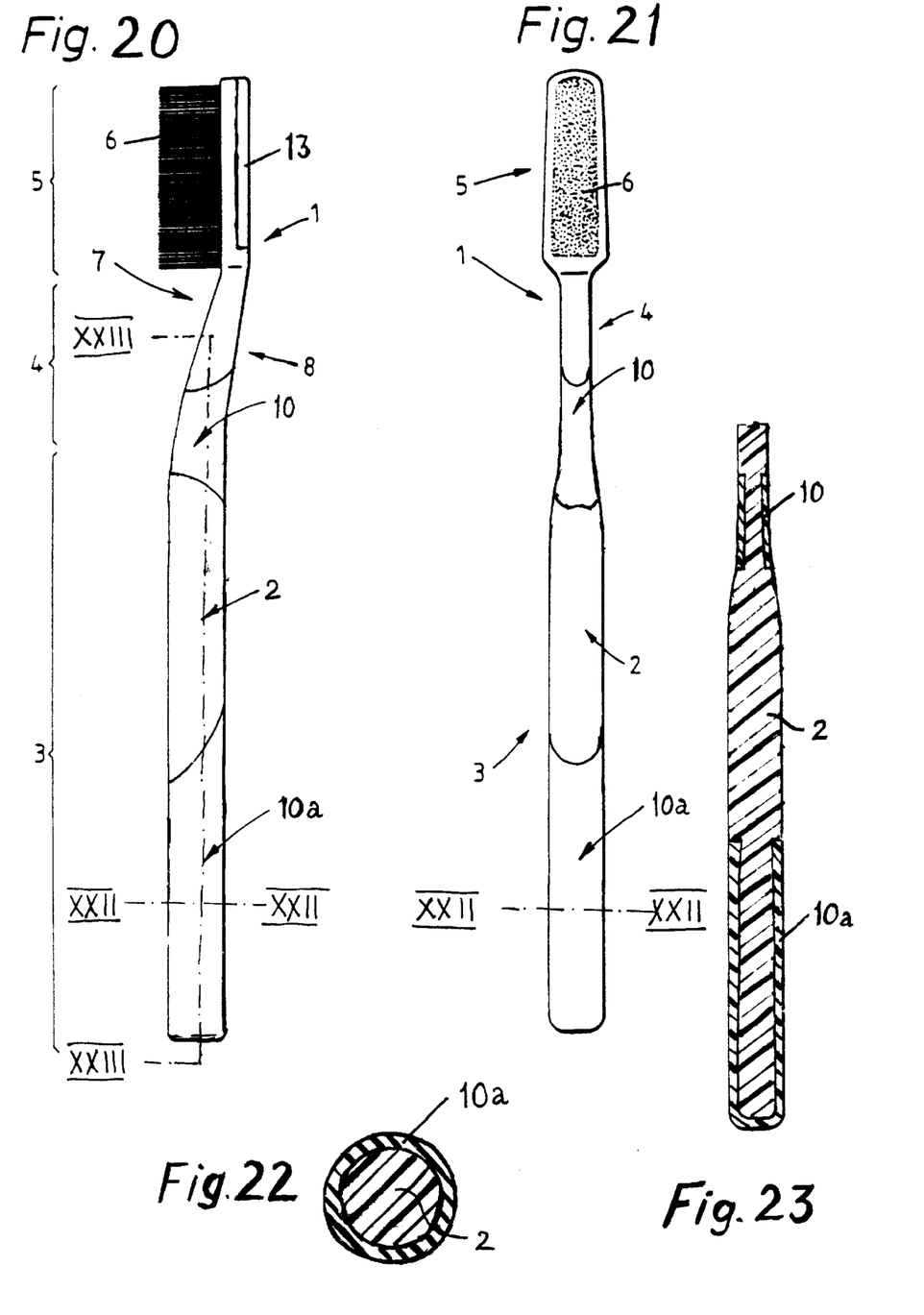
FIGS. 20, 21, 22 and 23 are a side view, a front view, a cross-section at XXII—XXII on FIGS. 21 and 22, and a longitudinal section XXIII—XXIII on FIG. 20, respectively, and represent an embodiment of the toothbrush, according to the invention.

It is important that the profiled sections 10 of the finger rest portions 9 allow the toothbrush to be held virtually equally well in practically all positions of rotation of the toothbrush. This is also facilitated by the shape of the cross section of the toothbrush body shown at, III—III in FIG. 2 which, while preferably having a rectangular or square cross section with rounded corners as shown in FIG. 3, may possibly have a circular cross section, as shown in FIG. 22.

The portions of the toothbrush made from the second material may have a different color than the rest of the toothbrush body, thus additionally distinguishing those portions from the toothbrush body. In cases where the toothbrush body is made of a transparent material, such differently colored second material may provide a highly satisfactory aesthetic appearance of the overall toothbrush.

In the example of FIG. 2, the finger rest portion 9 is located proximate to the front end, a part of the handle 3 which tapers towards the neck section 4 of the toothbrush. As indicated by dotted lines in FIG. 2 and solid lines in FIGS. 9 and 13, an ergonomic shaping of the finger rest portion 9 could, be provided, to correspond to the general shape of a thumb surface. This could be essentially symmetrically circumferential or at least be provided on the front and the rear of the toothbrush body 2.

Figure 14:
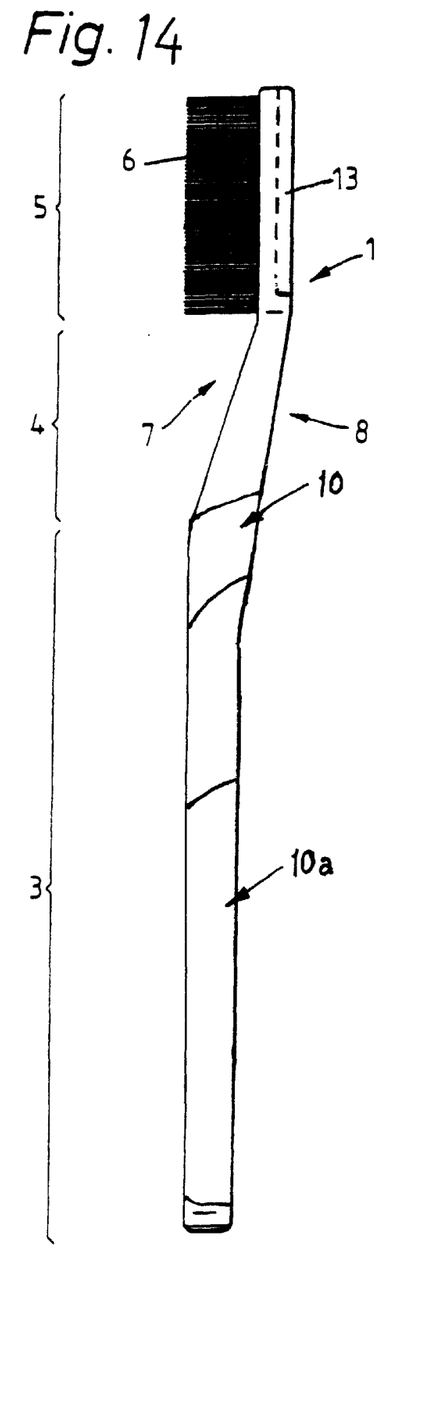
FIGS. 14 and 15 are side and rear views, the same as shown in FIGS. 6 and 7, respectively, of an embodiment of the toothbrush, according to the invention.
Figure 15:
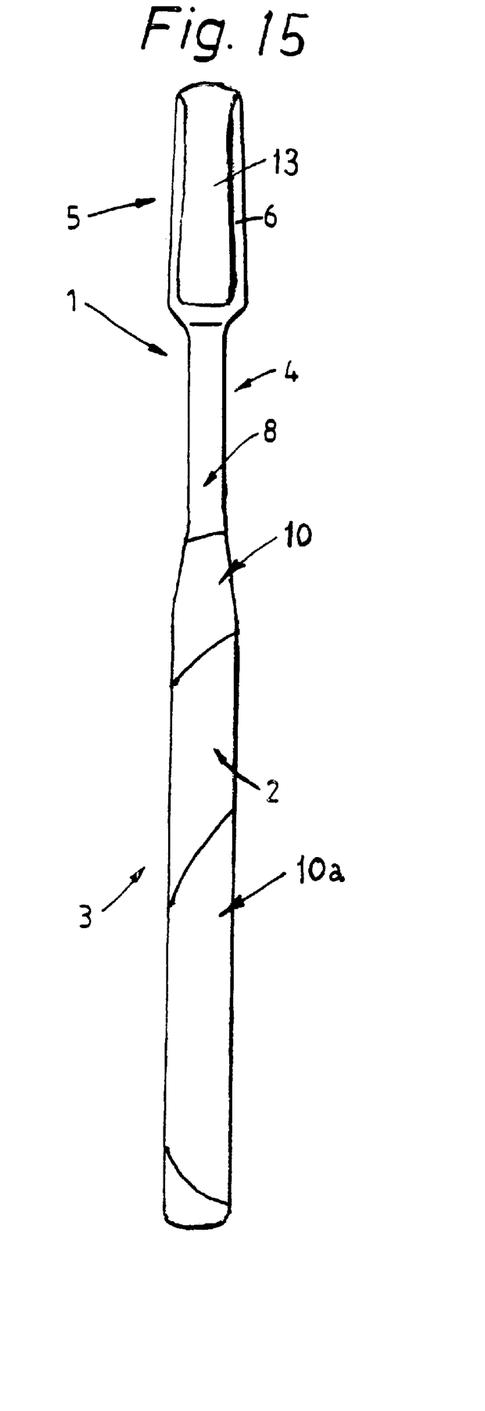
Figure 16:
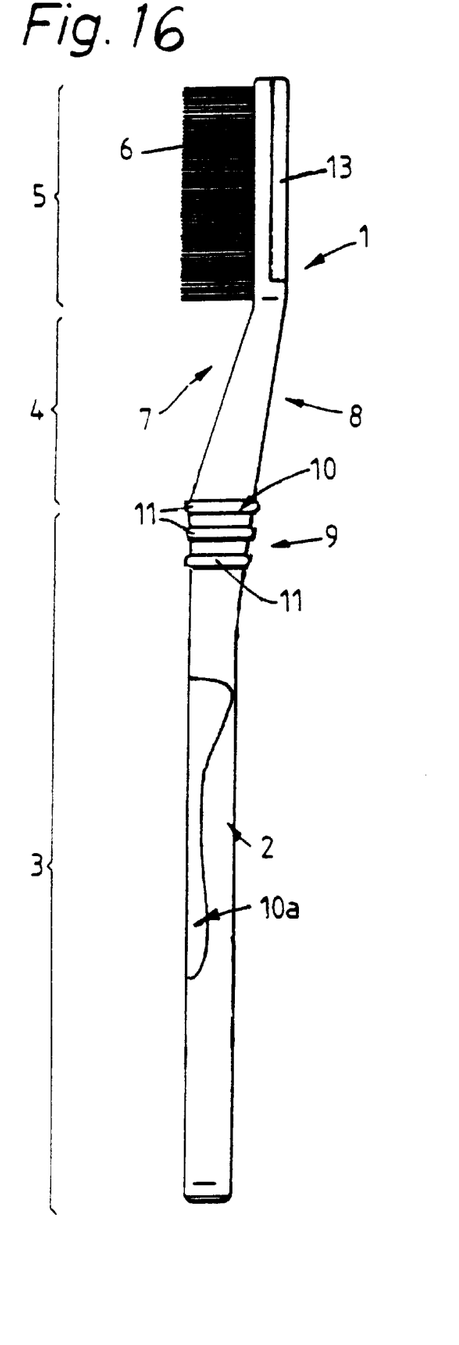
FIGS. 16 and 17 are side and front views, the same as shown in FIGS. 1 and 2, respectively, of an embodiment of the toothbrush, according to the invention.
Figure 17:
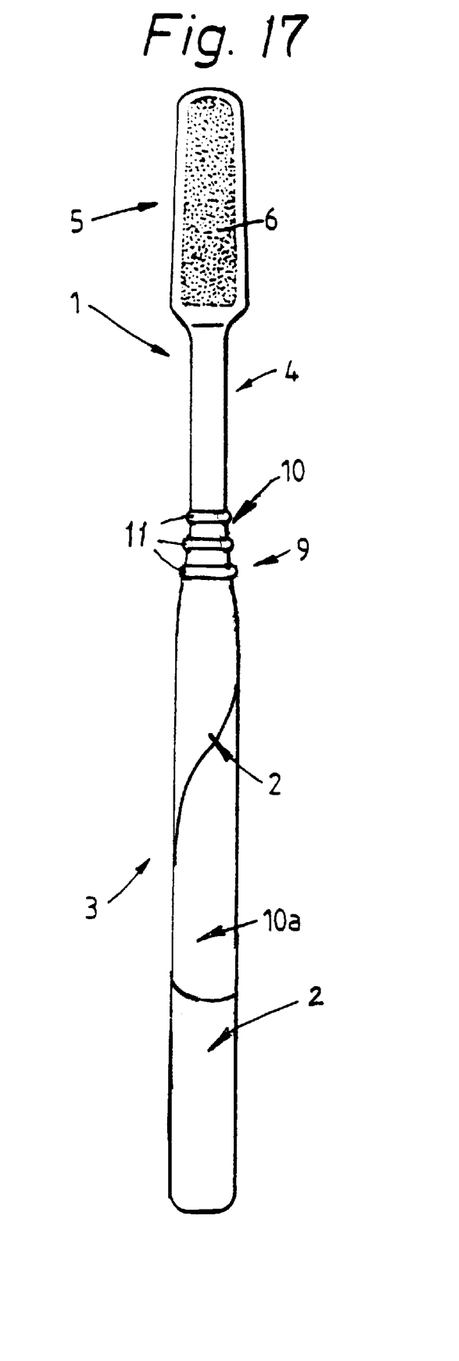
Figure 18:
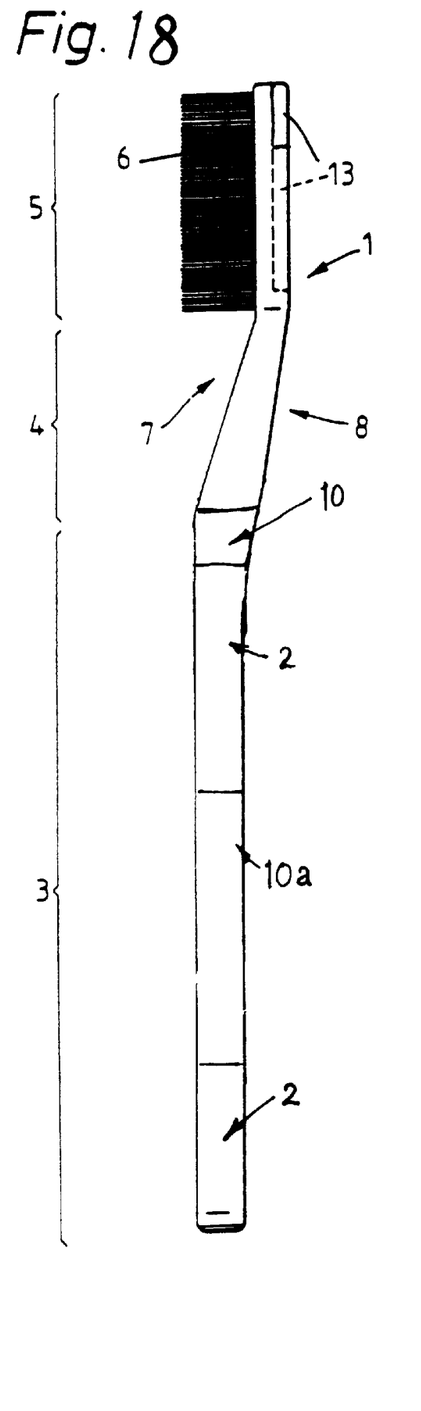
FIGS. 18 and 19 are side and rear views, the same as shown in FIGS. 6 and 7, respectively, of an embodiment of the toothbrush, according to the invention.
Figure 19:
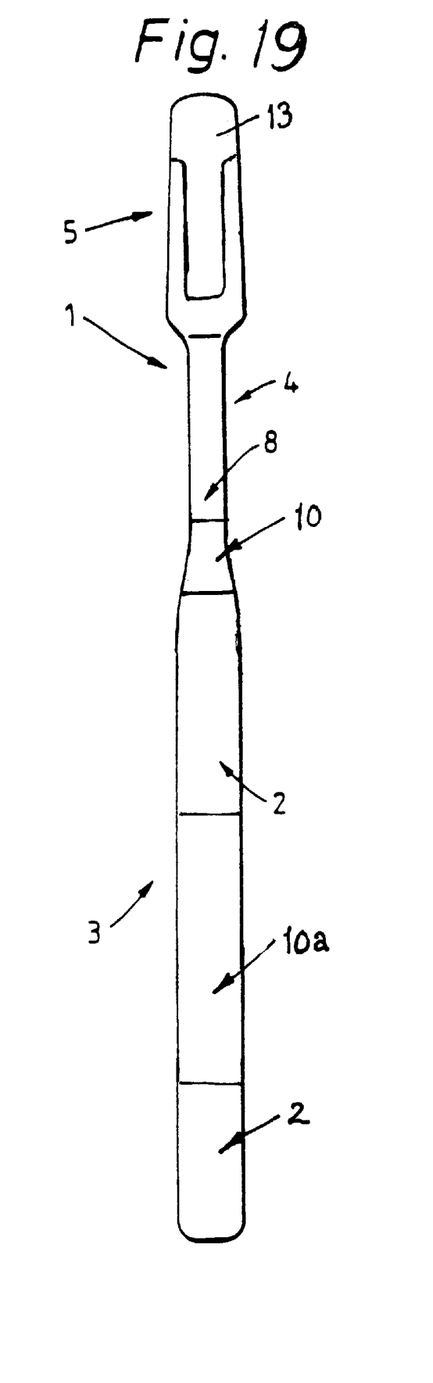

In addition to the profiled section 10 of the finger rest portion shown in FIGS. 1–2 and 6–21, it can be seen from the examples of FIGS. 1 and 2 and 6–21 that there is a further profiled section 10a at or proximate to the free end region of the handle 3, the section particularly serving as a rest for the ball of the palm. Like profiled section 10, profiled section 10a can also have circumferentially arranged rings 11; in FIGS. 1 and 2 and 6–9 only two such rings are provided. However, it should be noted that the number and spacing of rings 11 as shown in FIGS. 1 and 2 and 6–9 and 16 and 17 may vary both at the finger rest area 9 and at the free end region of the toothbrush. Alternately, profiled section 10a can have interrupted rings or can be a continuous area approximately flush with the body surface. Profiled section 10a can be any shape, that is, it need not be symmetrical but it is, preferably, at least in part circumferential around or wrapped around the sides of the handle. For example, FIGS. 14 and 15 show section 10a wrapping around handle 3. However the ends of section 10a are not perpendicular to the longitudinal axis of the handle, nor are the ends parallel to each other; one is convex and one is concave. As a further example, FIGS. 16 and 17 show section 10a only partially wrapping the circumference of handle 3. FIGS. 14 through 19 show profiled section 10a slightly removed from, or proximate to, the free end of the handle 3. FIGS. 20–21 and 23 clearly show section 10a wrapping around and encompassing the free end of the handle.

For the sake of clarity, the cross section of the finger rest portion 9 shown in FIG. 3 in the section through a ring 11 has a comparatively large recess depth, which, however, in practice could be a few tenths of a millimeter. If necessary, the rings 11 can also be injected directly or almost directly onto the surface of the handle 3 at the area of the finger rests portion 9 which is provided. The ring 11 may project above the surface of the body or be approximately flush with it.

In addition to the annular profiled sections 10 and 10a, surfaces 12 and 12a integral with the sections 10 and 10a, respectively, are provided in the example of FIGS. 1 and 2 at the front 7 and at the rear 8 of the toothbrush, approximately at the area of the ring-like profiled sections 10 and 10a. These surfaces or members 12 may project slightly above the contour of the brush body 2, be approximately flush with the profile height of the rings 11 or possibly extend slightly thereabove.

As shown in the drawings, in particular FIGS. 1–2, 6–9 and 16–17, the annular profiled sections 10 and 10a can be located at right angles to the longitudinal axis of the brush body. On the other hand, it is also possible to provide such sections 10 and 10a extending at an angle to the longitudinal axis of the brush body. Further, it is conceivable that approximately zigzag disposed profiled sections of that type are provided on the brush body.

As indicated by the portion 13 on head 5 of FIGS. 1, 6 and 7, 8, 10, 12, 14 and 15, 16, 18 and 19, and 20, such portion of the second material could be provided to make the edges or rear of the brush head softer.

Thus, during the making of the toothbrush, it will be noted that the portions of the second material are physically separated and isolated from each other as shown in FIGS. 1–2 and 6–21 and in FIG. 23 which shows a cross section of the toothbrush body. There is no material flow channel or channels between the portions for the second material to extend therethrough. Such interconnecting channels between the portions of the second material are undesirable, in particular because of loss of physical strength in the toothbrush body. Channels are also undesirable for aesthetic reasons, for example when the toothbrush body is made from a transparent material.

The invention is now to be further described with reference to FIGS. 4 and 5 of the drawings.

Figure 4:
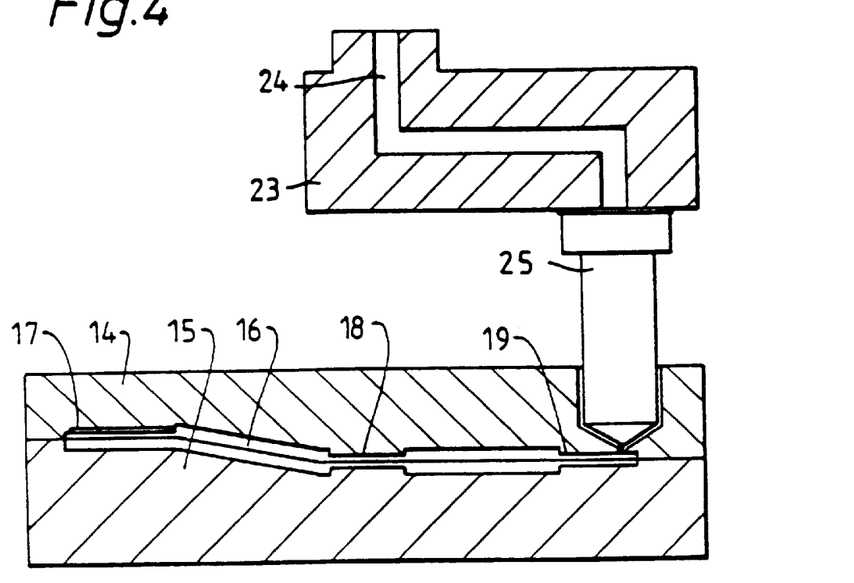
FIG. 4 shows a cross section through an injection molding apparatus for carrying out a method including a first injection step for making a toothbrush body of a first material.

In FIG. 4 there is shown an apparatus for making the toothbrush body 2 of the first material. In a conventional manner, two mold parts 14 and 15 are provided, the mold parts forming therebetween an injection cavity 16 to form the toothbrush body 2. As noted from FIG. 4, the head of the toothbrush has a recessed region 17 for receiving, in a subsequent injection molding step, the second material. Similarly, the toothbrush body is to have slimmer sections 18 and 19 near the neck and the free end of the toothbrush, respectively. The regions 17, 18 and 19 are intended for receiving the second material to form portions 20, 21 and 22, as to be further explained in connection with FIG. 5, and may be located in various locations along the toothbrush body. Regions 17, 18 and 19 may be spaced at any location along the toothbrush body 2. In FIG. 4, the first material for making the toothbrush body 2 is supplied through a manifold 23 having a material flow channel 24. The first material exits from the manifold through nozzle means 25 and into the cavity 16 at the rear end of the body 2 to be made.

Figure 5:
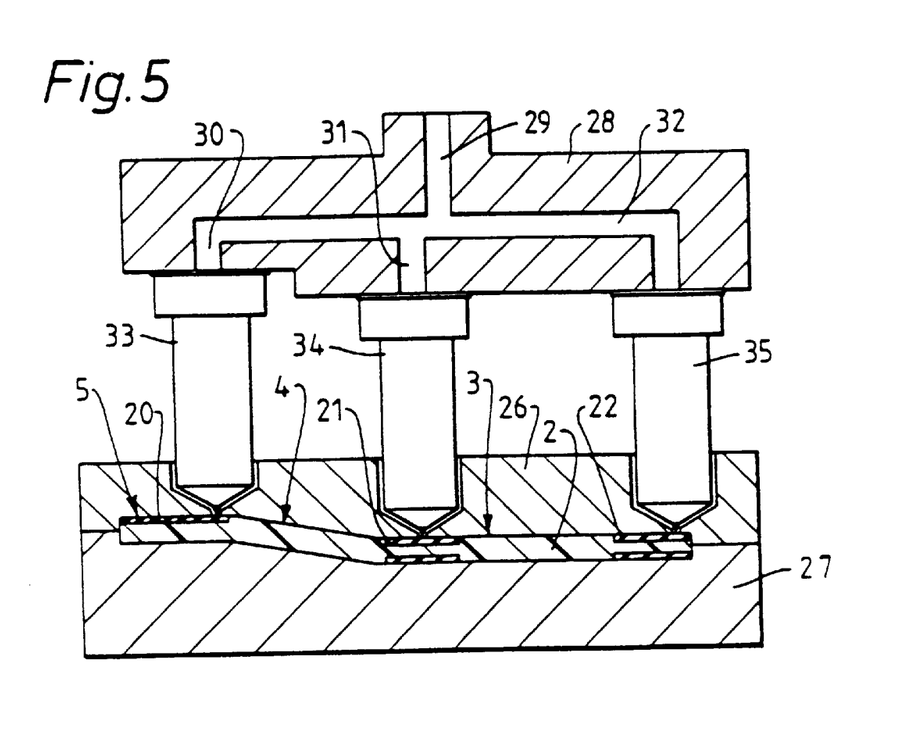
FIG. 5 shows a device for multi-point injection molding of a second material to fill out specific recesses on the toothbrush body.
Figure 6:
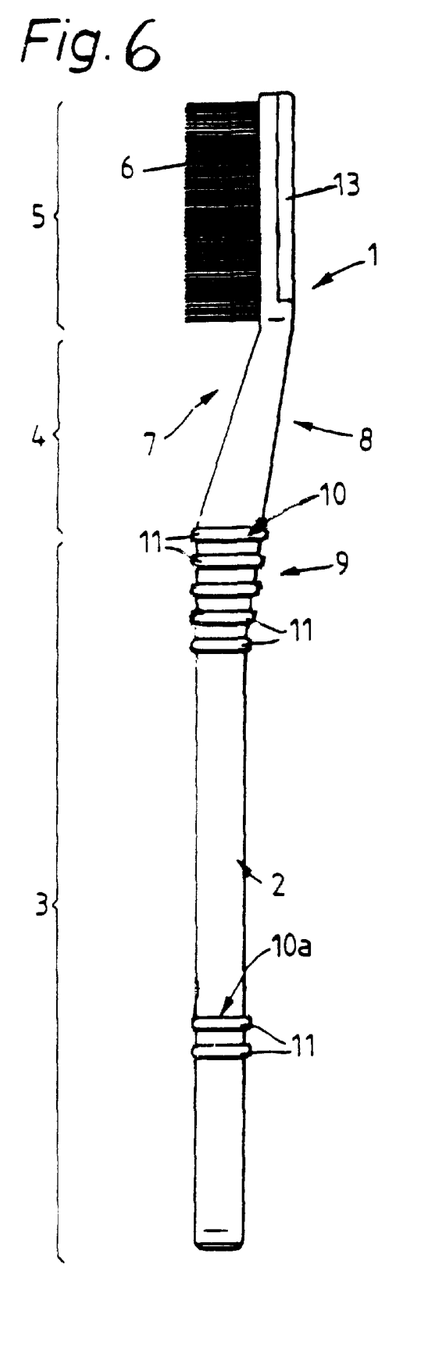
FIGS. 6 and 7 are side and rear views, respectively, of an embodiment of the toothbrush according to the invention.
Figure 7:
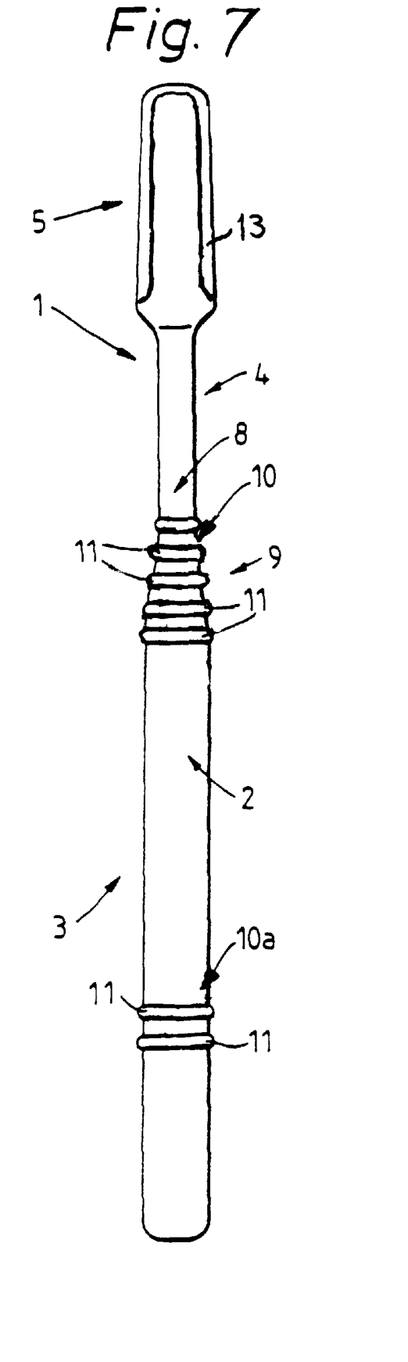
Figure 8:
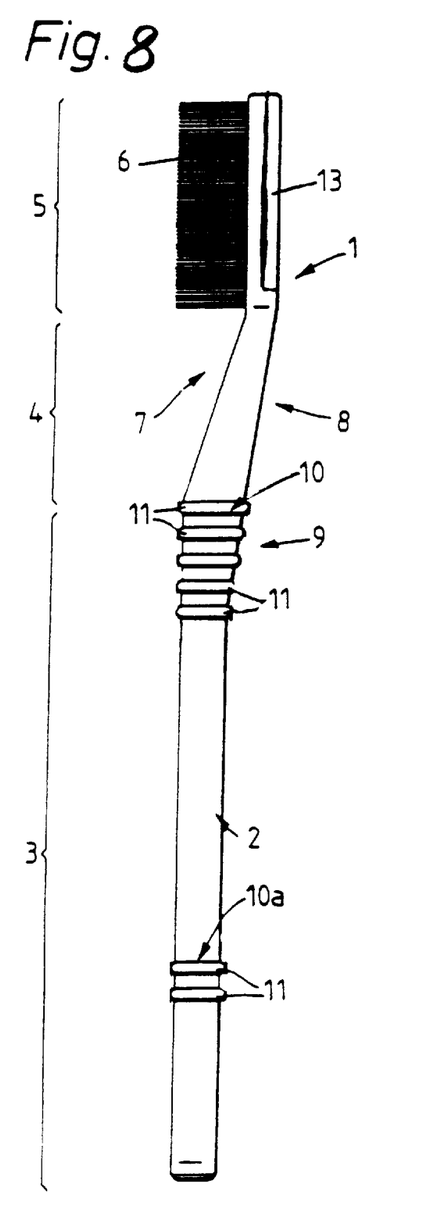
FIGS. 8 and 9 are side and front views, the same as shown in FIGS. 1 and 2, respectively, of an embodiment of the toothbrush according to the invention.
Figure 9:
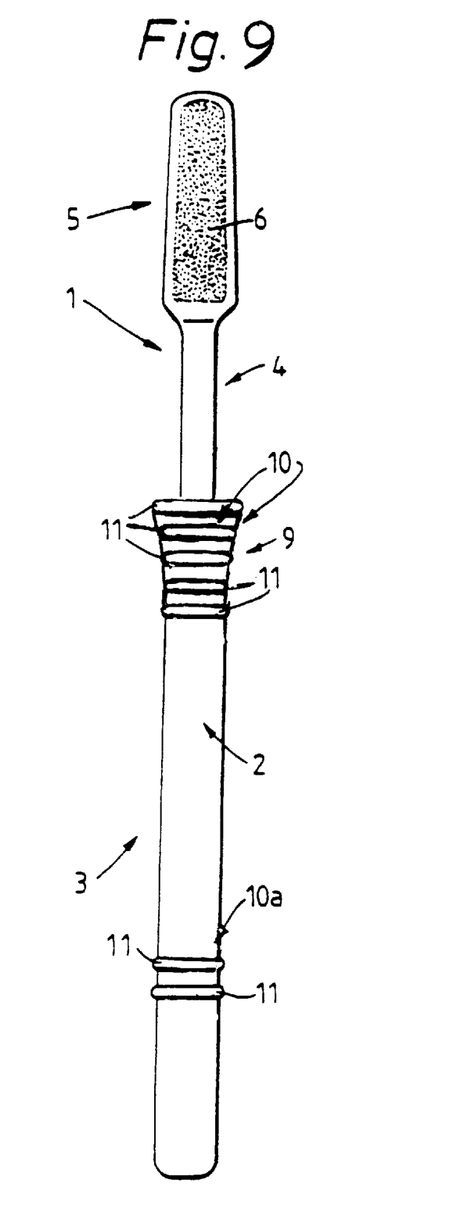
Figure 10:
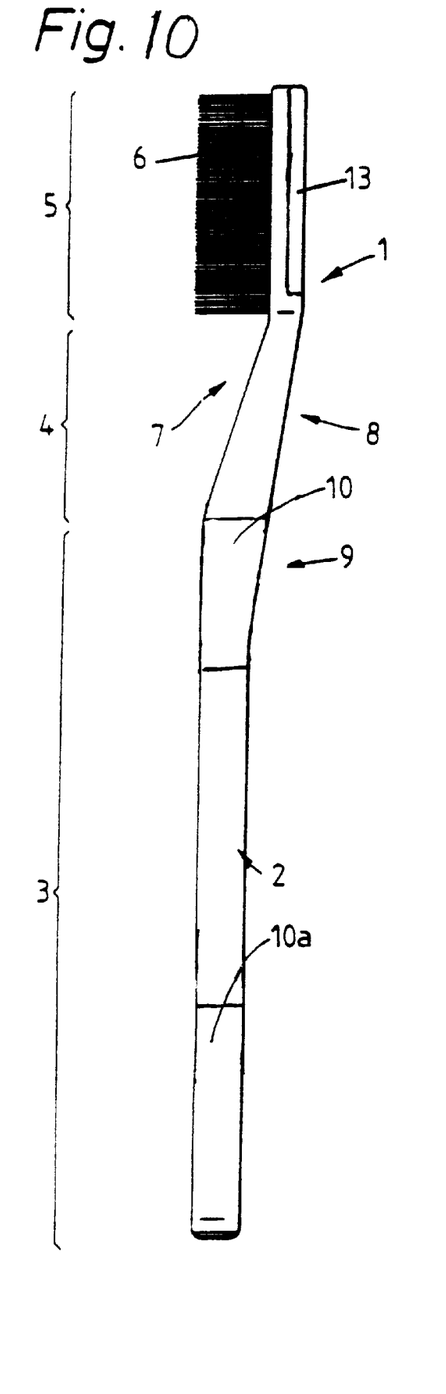
FIGS. 10 and 11 are side and front views, the same as shown in FIGS. 1 and 2, respectively, of an embodiment of the toothbrush, according to the invention.
Figure 11:
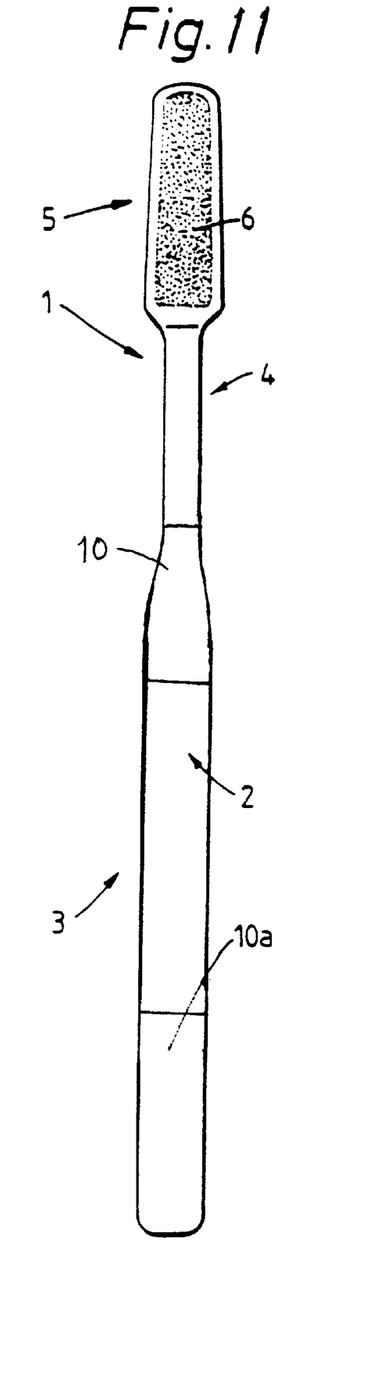
Figure 12:
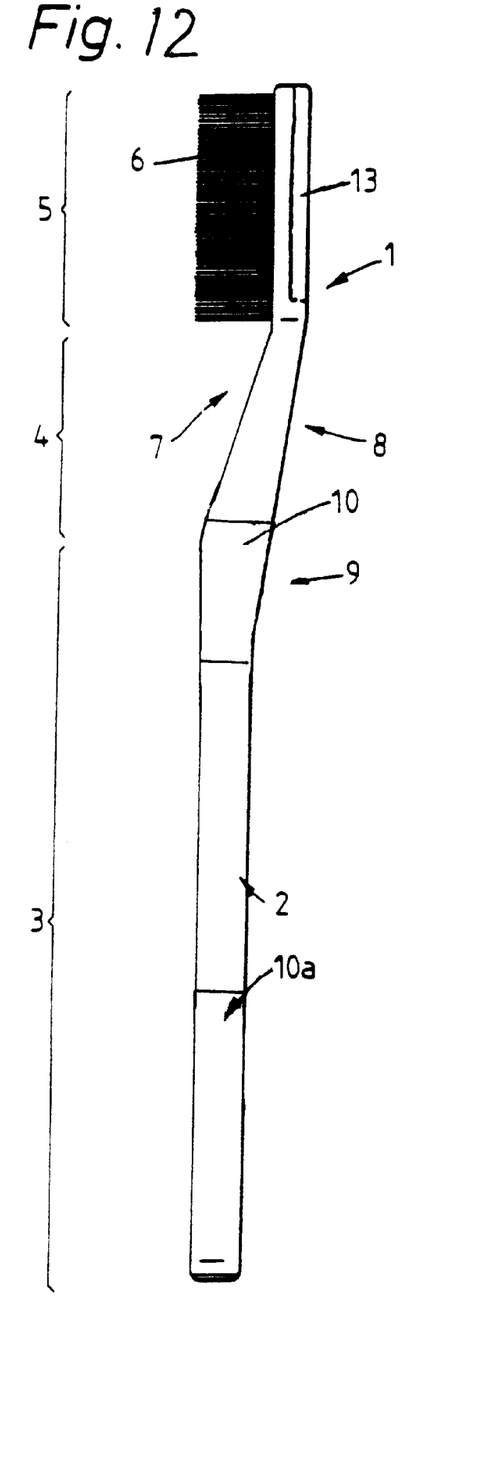
FIGS. 12 and 13 are side and front views, the same as shown in FIGS. 1 and 2, respectively, of an embodiment of the toothbrush, according to the invention.
Figure 13:
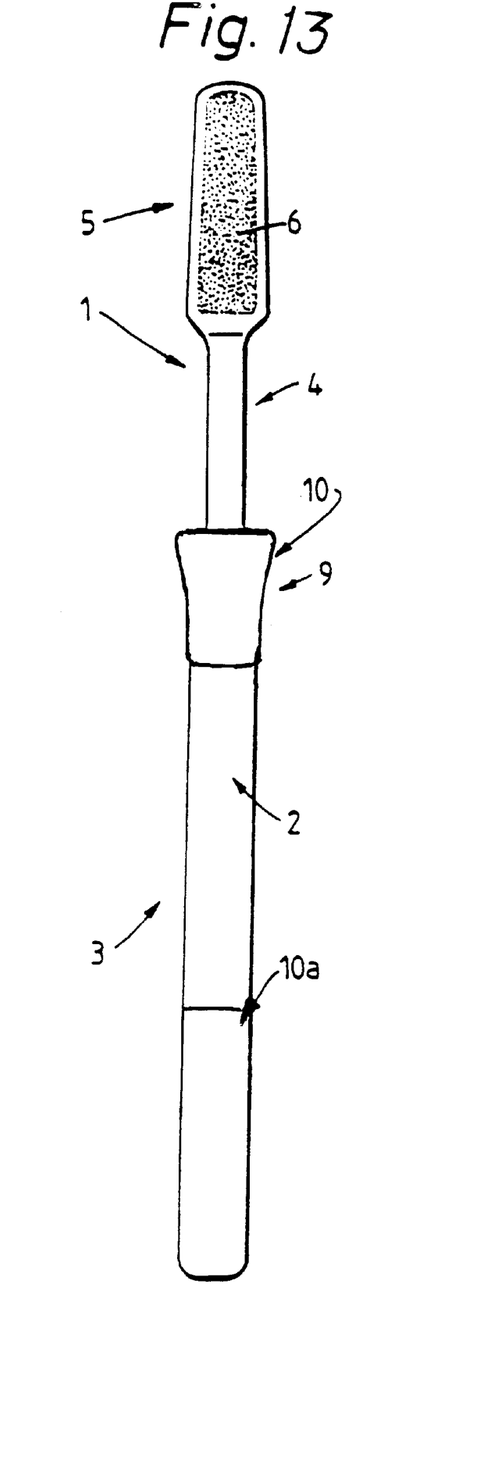

After completion of the first injection molding step for making the toothbrush body of the first material, the body is placed in a second mold constituted by mold parts 26 and 27 as shown in FIG. 5.

The apparatus has a manifold 28 with a material flow inlet 29 for the second material. The inlet 29 is branched off into outlet channels 30, 31 and 32. The material flow from channel 30 exits through a nozzle 33 into the region 17 of the toothbrush 2 (as shown in FIG. 4) to form the portion 20 on the toothbrush. Similarly the material flow from outlet channel 31 exits through a nozzle means 34 at region 18 of the toothbrush body 2 to form portion 21 on the toothbrush. Finally, the material flow from outlet channel 32 exits through nozzle means 35 at region 19 of body 2 to form portion 22 on the toothbrush. Thus, in the injection molding step as shown and described in connection with FIG. 5, multi-point injection molding is used to create the portions 20, 21 and 22 in a single injection molding step. As indicated above, and as further clearly seen from FIG. 5, there are no interconnecting material flow channels between any or each of the three created portions 20, 21 and 22, thus providing the toothbrush with an aesthetically satisfactory appearance, while retaining the physical strength of the overall toothbrush.

It will be readily understood that the examples illustrated in FIGS. 1, 2 and 3 and 6 through 23 of the toothbrush, as well as the examples shown in FIGS. 4 and 5 in connection with the method for making such toothbrush, may easily be modified within the scope and the inventive concept of the present invention.

Thus, it will be readily understood that although the multipoint injection as demonstrated in FIG. 5 has three nozzle means for single step injection molding, there could be provided, e.g., two nozzle means or four or more nozzle means with associated outlet channels in the manifold 28.

What is claimed is:

1. A toothbrush structure, comprising a toothbrush body having a front side and a rear side, the toothbrush body comprising a shaft-like handle, a head, and a neck section each made of a first material, the neck section joining the head to the handle, and the head retaining a plurality of toothbrush bristles, wherein the toothbrush body further comprises a pair of spaced-apart recesses which accommodate a first portion and a second portion of a second material, the first and second portions physically separated from each other by the first material, wherein the first portion is located at the head.

2. A toothbrush structure according to claim 1, wherein the first portion comprises second material located on the front side of the toothbrush body.

3. A toothbrush structure according to claim 1, wherein the first portion is a portion of the neck section.

4. A toothbrush structure according to claim 1, wherein the first portion comprises second material on a rear side of the toothbrush body.

5. A toothbrush structure according to claim 1, wherein the first portion comprises an annular profiled section.

6. A toothbrush structure according to claim 1, wherein the first portion comprises a substantially circumferentially profiled configuration.

7. A toothbrush structure according to claim 1, further comprising another recess spaced apart from the pair of recesses, the another recess accommodating a third portion of the second material, the third portion being completely physically separated from each of the first and second portions by the first material, wherein the third portion comprises second material located on the front side of the toothbrush body.

8. A toothbrush structure according to claim 1, further comprising another recess spaced apart from the pair of recesses, the another recess accommodating a third portion of the second material, the third portion being completely physically separated from each of the first and second portions by the first material, wherein the third portion is a portion of the neck portion.

9. A toothbrush structure according to claim 1, further comprising another recess spaced apart from the pair of recesses, the another recess accommodating a third portion of the second material, the third portion being completely physically separated from each of the first and second portions by the first material, wherein the third portion comprises second material on a rear side of the toothbrush body.

10. A toothbrush structure according to claim 1, further comprising another recess spaced apart from the pair of recesses, the another recess accommodating a third portion of the second material, the third portion being completely physically separated from each of the first and second portions by the first material, wherein the third portion comprises an annular profiled section.

11. A toothbrush structure according to claim 1, further comprising another recess spaced apart from the pair of recesses, the another recess accommodating a third portion of the second material, the third portion being completely physically separated from each of the first and second portions by the first material, wherein the third portion comprises a substantially circumferentially profiled configuration.

12. A toothbrush structure according to claim 1, wherein the second material is a synthetic material having at least one property selected from the group consisting of an elastic property, a non-slip property, a rubber-like property, and a color different from a color of the first material.

13. A toothbrush structure according to claim 1, wherein the first material is a transparent plastic material.

14. A toothbrush structure according to claim 1, wherein the toothbrush body further comprises another recess spaced apart from the pair of recesses, the another recess accommodating a third portion of the second material, the third portion being separated from each of the first and second portions by the first material.

15. A toothbrush structure according to claim 1, wherein the first portion is located proximal to a front end of the handle and the second portion is located on the handle.

16. A toothbrush structure according to claim 1, wherein the first portion comprises second material located on the front side of the toothbrush body.

17. A toothbrush structure according to claim 1, wherein the first portion is a portion of the neck section.

18. A toothbrush structure according to claim 1, wherein the first portion comprises second material on a rear side of the toothbrush body.

19. A toothbrush structure according to claim 1, wherein the first portion comprises an annular profiled section.

20. A toothbrush structure according to claim 1, wherein the first portion comprises a substantially circumferentially profiled configuration.

21. A toothbrush structure, comprising a toothbrush body having a front side and a rear side, the toothbrush body comprising a shaft-like handle, a head, and a neck section each made of a first material, the neck section joining the head to the handle, and the head retaining a plurality of toothbrush bristles, wherein the toothbrush body further comprises a pair of spaced-apart recesses which accommodate a first portion and a second portion of a second material, the first and second portions physically separated from each other by the first material, wherein the toothbrush body further comprises another recess spaced apart from said pair of recesses, the other recess accommodating a third portion of the second material, the third portion being physically separated from each of the first and second portions by the first material, and wherein the third portion is located at the head.

22. A toothbrush structure according to claim 21, wherein the third portion comprises second material located on the front side of the toothbrush body.

23. A toothbrush structure according to claim 21, wherein the third portion is a portion of the neck portion.

24. A toothbrush structure according to claim 21, wherein the third portion comprises second material on a rear side of the toothbrush body.

25. A toothbrush structure according to claim 21, wherein the third portion, comprises an annular profiled section.

26. A toothbrush structure according to claim 21, wherein the third portion comprises a substantially circumferentially profiled configuration.

27. A toothbrush comprising:
a toothbrush body comprising a shaft-like handle, a head piece, and a neck section each made of a first material; said toothbrush body further comprising a first end and free end; the neck section joining the handle to the head piece, the head piece holding a plurality of toothbrush bristles;
said toothbrush body further comprising a first portion and a second portion made of a second material; the first and second portions of the second material being separated by the first material; the first portion being located proximate to the front end of the handle; the second portion being located proximate to the free end of the handle; and
a third portion made of the second material; the third portion of second material being separated from the first and second portions by the first material; the third portion being located at the head piece.

28. A toothbrush structure according to claim 27, wherein the third portion is a portion of the neck.

29. A toothbrush structure according to claim 1, 21 or 27, wherein the first portion comprises at least one annular ring.

30. A toothbrush structure according to claim 1, 21, or 27, wherein the second portion comprises at least one annular ring.

* * * * *